(12) United States Patent
Mori et al.

(10) Patent No.: US 8,680,806 B2
(45) Date of Patent: Mar. 25, 2014

(54) NUMERICALLY CONTROLLED MACHINE TOOL AND NUMERICAL CONTROL DEVICE

(75) Inventors: Norio Mori, Kanagawa (JP); Tadashi Kasahara, Kanagawa (JP); Tadahiro Nishiguchi, Kanagawa (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 598 days.

(21) Appl. No.: 12/769,939

(22) Filed: Apr. 29, 2010

(65) Prior Publication Data

US 2010/0207567 A1   Aug. 19, 2010

Related U.S. Application Data

(62) Division of application No. 12/740,126, filed as application No. PCT/JP2007/071750 on Nov. 2, 2007.

(51) Int. Cl.
*G05D 23/275* (2006.01)
(52) U.S. Cl.
USPC .......................... 318/632; 318/569; 318/567
(58) Field of Classification Search
USPC ............ 318/632, 567, 569, 561, 490, 400.41, 318/452; 700/110
See application file for complete search history.

(56) References Cited

U.S. PATENT DOCUMENTS

| | | | |
|---|---|---|---|
| 5,257,460 A * | 11/1993 | McMurtry | 33/502 |
| 5,545,959 A | 8/1996 | Otsuki et al. | |
| 6,357,286 B1 | 3/2002 | Kanematsu et al. | |
| 8,380,340 B2 * | 2/2013 | Abe | 700/180 |
| 2002/0049514 A1 | 4/2002 | Puchtler | |
| 2005/0234671 A1 | 10/2005 | Morfino | |
| 2006/0136088 A1 | 6/2006 | Sato et al. | |
| 2009/0112356 A1 * | 4/2009 | Abe | 700/193 |

FOREIGN PATENT DOCUMENTS

| | | |
|---|---|---|
| DE | 19858154 A1 | 6/2000 |
| EP | 1450224 A1 | 8/2004 |
| JP | 03-048903 | 3/1991 |
| JP | 6-088192 B2 | 11/1994 |
| JP | 08-152909 | 6/1996 |
| JP | 09237112 A | 9/1997 |

(Continued)

OTHER PUBLICATIONS

Tsutsumi M. et al.; "Identification and Compensation of Systematic Deviations Particular to 5-Axis Machining Centers;" International Journal of Machine Tools and Manufacture—Design, Research and Application; Elsevier Science Ltd.; vol. 43; No. 8; Jun. 1, 2003; pp. 771-780.

*Primary Examiner* — Karen Masih
(74) *Attorney, Agent, or Firm* — Paul & Paul

(57) ABSTRACT

A numerically controlled machine tool has a linear and rotational feed and has functions for measuring in advance, errors of a relative position and a relative attitude of a main spindle relative to a work table by positioning the linear and rotational feed axes to specified position and attitude, and correcting a movement command based on measured error data, the data being multi-dimensional data containing a position error and an attitude error. The machine tool includes a error data storage means which store an error map prepared by collecting a plurality of the error data corresponding to positions and rotation angles of the linear and rotational feed axes, and a correction data computing means which compute correction data for correcting movement command from a command position for the linear and rotational feed axes and the error data stored in the error data storage means.

5 Claims, 18 Drawing Sheets

(56) References Cited

FOREIGN PATENT DOCUMENTS

| JP | 2000 310530 A | 11/2000 |
| JP | 2002520709 A | 7/2002 |
| JP | 2002535756 A | 10/2002 |
| JP | 2003121134 A | 4/2003 |
| JP | 2004-272887 | 9/2004 |
| JP | 2005-059102 | 3/2005 |
| JP | 200691056 A | 4/2006 |
| JP | 2006-155530 | 6/2006 |
| JP | 2006-289524 | 10/2006 |
| JP | 2007034986 A | 2/2007 |
| JP | 2007-168013 | 7/2007 |
| WO | 0042553 A2 | 7/2000 |
| WO | 0003312 | 1/2001 |
| WO | WO 2004/034164 A1 | 4/2004 |
| WO | 2007068912 A1 | 6/2007 |

* cited by examiner

Fig.4

| | | A-AXIS | | | |
|---|---|---|---|---|---|
| | | A1 DEGREES | A2 DEGREES | ... | An DEGREES |
| C-AXIS | C1 DEGREES | $[X_{11}, Y_{11}, Z_{11}]$ $[I_{11}, J_{11}, K_{11}]$ | $[X_{12}, Y_{12}, Z_{12}]$ $[I_{12}, J_{12}, K_{12}]$ | ... | $[X_{1n}, Y_{1n}, Z_{1n}]$ $[I_{1n}, J_{1n}, K_{1n}]$ |
| | C2 DEGREES | $[X_{21}, Y_{21}, Z_{21}]$ $[I_{21}, J_{21}, K_{21}]$ | $[X_{22}, Y_{22}, Z_{22}]$ $[I_{22}, J_{22}, K_{22}]$ | ... | |
| | ⋮ | ⋮ | ⋮ | ⋮ | |
| | Cm DEGREES | $[X_{m1}, Y_{m1}, Z_{m1}]$ $[I_{m1}, J_{m1}, K_{m1}]$ | | | $[X_{mn}, Y_{mn}, Z_{mn}]$ $[I_{mn}, J_{mn}, K_{mn}]$ |

Fig.15

|  |  |  | $[B_n,C_1]$ | ...... | $[B_n,C_n]$ |  |  |  |
|---|---|---|---|---|---|---|---|---|
|  |  |  | ...... | REFERENCE ATTITUDE [0, 0] | ...... |  |  |  |
|  |  |  | $[B_1,C_1]$ | ...... | $[B_1,C_n]$ |  |  |  |
| $[B_n,C_1]$ | ...... | $[B_1,C_1]$ | $[B_1,C_1]$ | ...... | $[B_1,C_n]$ | $[B_m,C_m]$ | ...... | $\begin{bmatrix}B_{n+1},\\C_m\end{bmatrix}$ |
| ...... | REFERENCE ATTITUDE [0, 0] | ...... | ...... | REFERENCE ATTITUDE [0, 0] | ...... | ...... | REFERENCE ATTITUDE [0, 0] | ...... |
| $[B_n,C_n]$ | ...... | $[B_1,C_n]$ | $[B_n,C_1]$ | ...... | $[B_n,C_n]$ | $\begin{bmatrix}B_m,\\C_{n+1}\end{bmatrix}$ | ...... | $\begin{bmatrix}B_{n+1},\\C_{n+1}\end{bmatrix}$ |
|  |  |  | $[B_m,C_m]$ | ...... | $\begin{bmatrix}B_{n+1},\\C_m\end{bmatrix}$ |  |  |  |
|  |  |  | ...... | REFERENCE ATTITUDE [0, 0] | ...... |  |  |  |
|  |  |  | $\begin{bmatrix}B_m,\\C_{n+1}\end{bmatrix}$ | ...... | $\begin{bmatrix}B_{n+1},\\C_{n+1}\end{bmatrix}$ |  |  |  |
|  |  |  | $[B_m,C_m]$ | ...... | $\begin{bmatrix}B_{n+1},\\C_m\end{bmatrix}$ |  |  |  |
|  |  |  | ...... | REFERENCE ATTITUDE [0, 0] | ...... |  |  |  |
|  |  |  | $\begin{bmatrix}B_m,\\C_{n+1}\end{bmatrix}$ | ...... | $\begin{bmatrix}B_{n+1},\\C_{n+1}\end{bmatrix}$ |  |  |  |

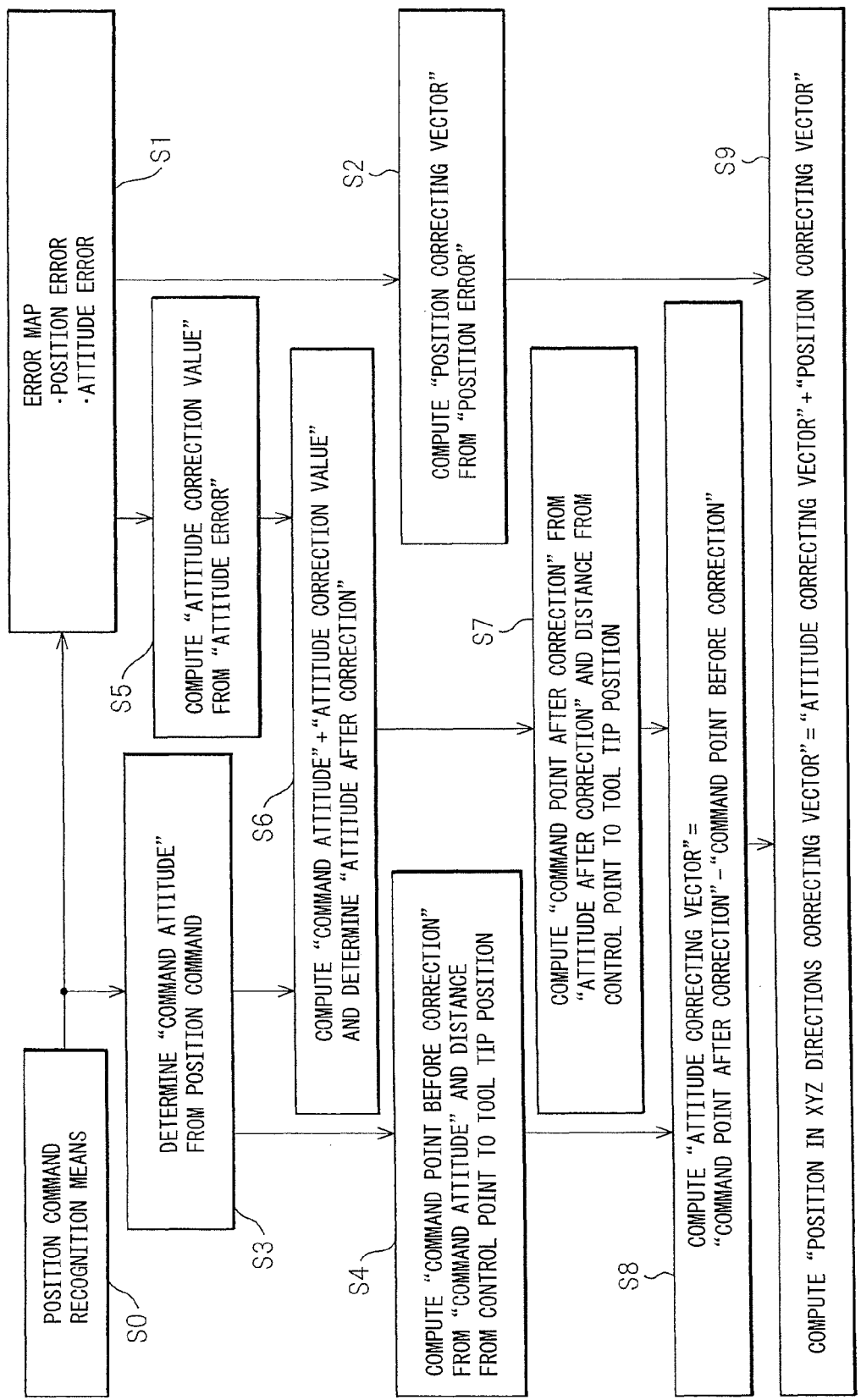

US 8,680,806 B2

NUMERICALLY CONTROLLED MACHINE TOOL AND NUMERICAL CONTROL DEVICE

CROSS-REFERENCE TO RELATED APPLICATIONS

This is a division of U.S. patent application Ser. No. 12/740,126 filed Apr. 28, 2010, which, in turn, is based upon PCT application PCT/JP2007/071750, filed Nov. 2, 2007, priority from both of which are claimed.

FIELD OF THE INVENTION

The present invention relates to a numerically controlled machine tool which has a linear feed axis and a rotational feed axis and in which a main spindle and a table are movable relative to each other.

BACKGROUND ART

In a machine tool which has a linear feed axis and a rotational feed axis, it is generally difficult to position a tool at a desired position since an error may occur when the feed axes are moved in accordance with a movement command. Therefore, when highly precise processing is desired, correction has to be carried out depending on the machine error. In order to carry out the correction, the machine error needs to be measured accurately as a preliminary step of correction. The following documents disclose the prior art of measurement and correction of errors.

In Japanese Patent Publication of Examined Patent Application (Kokoku Publication) No. H06-088192 (JP-H06-088192 B1), a method is disclosed in which deviations of two rotational feed axes (deviation of the position of the center of axes) of a machine tool which has two rotational feed axes (A, B) that are orthogonal to each other are measured in advance, and coordinates of the two rotational feed axes are determined by taking these deviations into account.

In Japanese Patent Publication of Unexamined Patent Application (Kokai Publication) No. 2004-272887 (JP-2004-272887-A1), a method is disclosed in which, in a machine tool which has three linear feed axes (X, Y, Z) that are orthogonal to each other and two rotational feed axes (A, C) that are orthogonal to each other, the position to which the machine has to be actually moved is determined based on deviations of the center of a rotating shaft or the center of turning of a spindle, and by using drive control means, the linear feed axes and the rotational feed axes are moved to the determined position so as to correct the position of the tool tip.

In Japanese Patent Publication of Unexamined Patent Application (Kokai Publication) No. H09-237112 (JP-09-237112-A1), a method is disclosed in which an error of a tool unit of a machine tool having a parallel link mechanism is corrected based on an error map. The error map has error data corresponding to each lattice point that have been calculated by computation from the difference between the command value of a position and a posture for tool tip of the tool unit and the measured value of them.

In the pamphlet of WO 2004/034164, a system and a process for measuring, correcting and testing numerically controlled machine tool heads and/or tables are disclosed which are automated and integrated in a numerically controlled system. This system comprises at least one support base that is equipped with a plurality of distance sensors, and at least one device of gauge tool type that is equipped with connection means for the heads at one of its ends and with a ball at another opposite end. The ball is placed next to the distance sensors, so that the distance sensors are able, at any time and in any position, to move to any position in order to measure the distance that separates them from the ball, and to thereby determine the position in the Cartesian space.

In the correction methods disclosed in JP-H06-088192 B1 and JP-2004-272887 A1, deviation of the rotational axis is corrected. Thus, there is a problem that errors or the like which vary depending on the undulation of the rotational axis itself or on the position of the linear feed axis cannot be corrected. The error map disclosed in JP-H09-237112 A1 is the error of the tip of a tool unit that is driven by a parallel link mechanism obtained as table data. Thus, there is a problem that this method is not applicable to a machine tool which has a linear feed axis and a rotational feed axis. In the measurement method disclosed in the pamphlet of WO 2004/034164, only the center position of a reference ball is measured, so that there is a problem that deviation of the position of the tool tip produced due to an error of the posture of the main spindle relative to the table due to variation of the tool length or projecting length of the tool cannot be corrected.

DISCLOSURE OF THE INVENTION

The present invention aims to resolve above-described problems associated with prior art, and therefore, it is an object of the present invention to provide a numerically controlled machine tool which has a linear feed axis and a rotational feed axis, and a numerically controlled machine tool having error map preparation function.

In accordance with the present invention, there is provided a numerically controlled machine tool which has a linear feed axis and a rotational feed axis and which has functions of measuring in advance errors of a relative position and a relative attitude of a main spindle relative to a work table by positioning said linear feed axis and said rotational feed axis to specified position and attitude, and of correcting a movement command based on measured error data, said error data being multi-dimensional data containing a position error and an attitude error, said machine tool comprising: a error data storage means which store an error map that is prepared by collecting a plurality of said error data corresponding to positions and rotation angles of said linear feed axis and said rotational feed axis, and a correction data computing means which compute correction data for correcting said movement command from a command position for said linear feed axis and said rotational feed axis and said error data stored in said error data storage means.

Also, in accordance with the present invention, there is provided the numerically controlled machine tool, wherein said position error is an error of relative position of said main spindle relative to said work table, an error being expressed as 3-dimensional coordinate values when said rotational feed axis is positioned to specified rotation angle, and wherein said attitude error is an error of relative attitude of said main spindle relative to said work table, an error being expressed as inclination angle when a first rotational feed axis and a second rotational feed axis that are orthogonal to each other are positioned at specified rotation angles.

Also, in accordance with the present invention, there is provided the numerically controlled machine tool, wherein a measurement spacing of said rotation angles in said first rotational feed axis and said second rotational feed axis is set such that a difference of said attitude error between adjoining measurement points is a specified value Also, in accordance with the present invention, there is provided the numerically controlled machine tool, wherein, when a tool tip position of a rotary tool mounted to said main spindle is to be positioned in accordance with said command position, said correction data computing means compute an amount of a deviation of 3-dimensional coordinate values of said tool tip position from said attitude error and a dimension of said rotary tool, and thereby correct said movement command for said linear feed axis Also, in accordance with the present invention, there is provided a numerical control device which controls a machine tool having a linear feed axis and a rotational feed axis and which has a function of correcting movement command for feed axes based on error data that have been measured in advance, said device comprising: a error data storage means that store an error map prepared by collecting a plurality of said error data corresponding to a position and rotation angle of said feed axes, said error data being data containing a position error and an attitude error, and a correction data computing means which compute correction data for correcting said movement command from a command position for said feed axes and said error data stored in said error data storage means.

In accordance with the numerically controlled machine tool and the numerical control device, an error map can be prepared by measuring the position error and the attitude error of the numerically controlled machine tool which has a linear feed axis and a rotational feed axis. In an error map prepared in accordance with the present invention, error data for the position error and the attitude error that change as the feed axes are moved are stored separately, and the position command is corrected based on the error data. Therefore, in accordance with the present invention, even when the tool length or the tool projecting length varies, the tool tip or the processing point of the tool can be positioned to the target position with high precision. In case where measurement points are set such that the coordinate position of the linear feed axis is the same in adjoining measurement regions, influence of mounting error of the measurement device can be eliminated. In case where separation between adjoining measurement points is set such that the difference of error is constant everywhere, the amount of data of the error map can be reduced while maintaining the precision of correction. In case where an error map is prepared by measuring the processed test piece or work piece, errors produced due to deflection of the main spindle or the tool due to rotation of the main spindle, flexure of the machine or the tool due to load, or the like, can be corrected.

In the present invention, the term "command position" refers to the position of the destination point of the feed axis commanded by a processing program, and the term "position command" refers, from among the command pulses issued from the interpolation section to the servo section based on command position, command velocity, and the like, to the command for controlling the position of the feed axis.

BRIEF DESCRIPTION OF DRAWINGS

Above and other objects, features and advantages of the present invention will become more apparent from the following description of preferred embodiments with reference to appended drawings, in which:

FIG. 4 is a view of 2-dimensional data sheet (map data) associated with each lattice point of FIG. 3;

FIG. 15 is a developed view of five surfaces of a rectangular parallelopiped showing the area to be processed for each indexed angle;

FIG. 19 is a flow chart showing an example of correction method using an error map.

BEST FORM FOR IMPLEMENTING THE INVENTION

Figure 1:
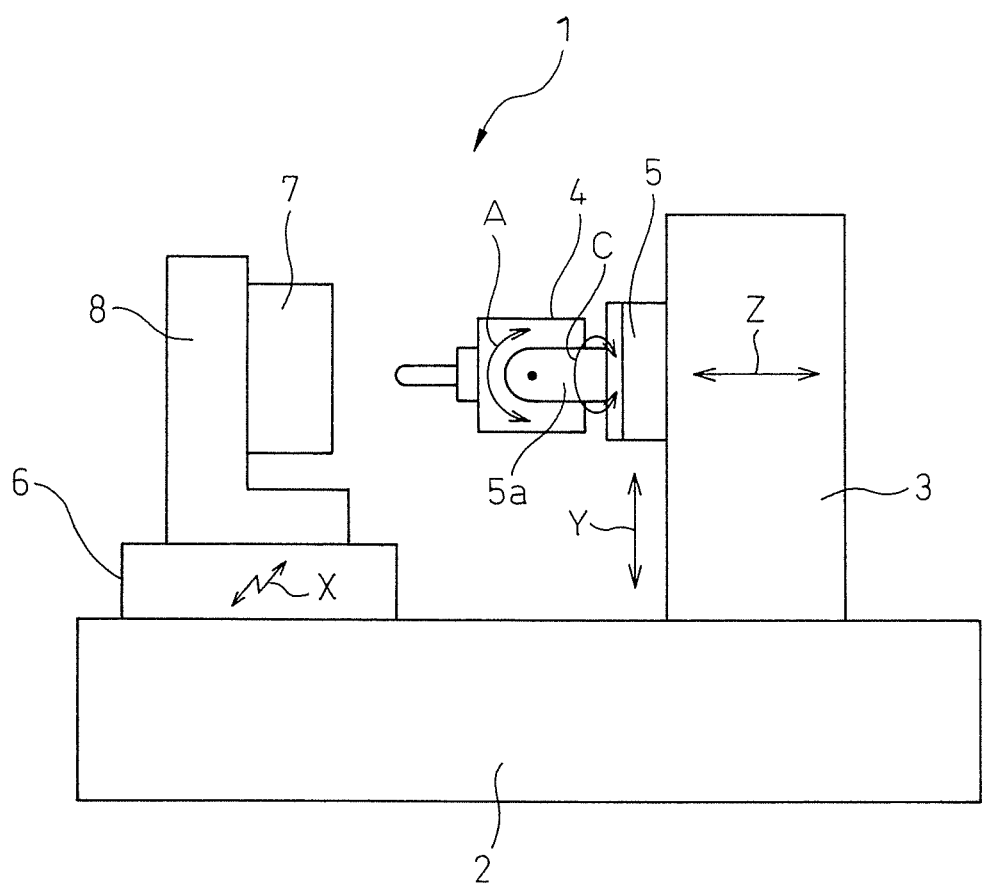
FIG. 1 is a side view showing a numerically controlled machine tool according to the present invention.

The present invention will be described below with reference to appended drawings showing preferred embodiments thereof. A numerically controlled machine tool according to the present invention comprises a numerical control device for controlling an operation of a machine in accordance with a processing program. In FIG. 1, the construction of a five-axis horizontal type machining center having two rotational feed axes on the main spindle side, is shown. Referring to FIG. 1, machining center 1 comprises bed 2 provided on the floor, column 3 that is erected on bed 2 and is capable of being moved linearly in a direction of Z-axis, and main spindle stock 5 that is capable of being moved linearly in a direction of Y-axis which is perpendicular to the direction of column 3. On main spindle stock 5, a bracket 5a is supported rotatably about C-axis which is parallel to Z-axis. On bracket 5a, main spindle head 4 is supported rotatably about A-axis which is parallel to X-axis. On main spindle head 4, a main spindle for holding a tool is rotatably supported.

Machining center 1 is erected on bed 2 at a position opposed to main spindle head 4, and comprises table 6 that is capable of being moved linearly in a direction of X-axis which is perpendicular to the paper surface work piece 7 is held via angle plate (equerre) 8 on table 6.

Figure 2:
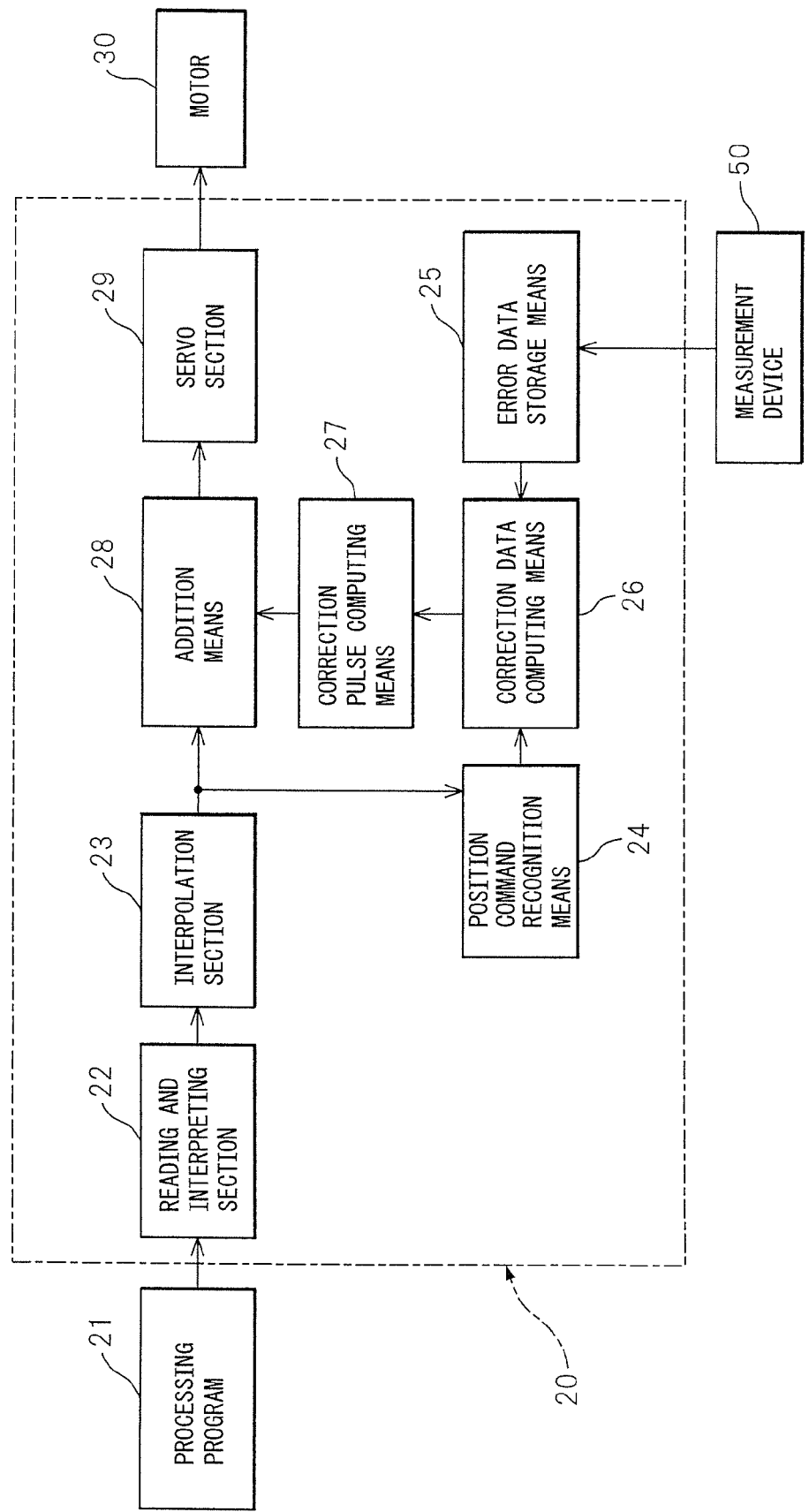
FIG. 2 is a block diagram showing a numerical control device of the numerically controlled machine tool according to an embodiment of the present invention.

FIG. 2 is a block diagram showing the construction of numerical control device 20 that controls the position of feed axes of the machine tool.

Numerical control device 20 shown in FIG. 2 has the function of correcting position error and attitude error of the machine tool, and comprises reading and interpreting section 22 that reads and interprets processing program 21 to compute a command velocity and a command position for each feed axis, interpolating section 23 that computes command pulses based on the command position, command velocity, and the like to perform linear interpolation or circular interpolation of feed for each feed axis, position command recognition means 24 that obtains the command pulses and recognizes a position command for each feed axis, a computation section that computes a position error and an attitude error for a measurement point based on measurement data measured with measurement device 50 and the coordinates of the measurement point, error data storage means 25 that store the position error and the attitude error computed by the computation section in correspondence to the position of the linear feed axis and the rotation angle of the rotational feed axis, correction data computing section 26 that computes correction data for correcting the position command from the position command and the error data stored in error data storage means 25, correction pulse computation means 27 that determine a correction pulse for correcting the position command based on the correction data, and addition means 28 that output the pulse obtained by adding the correction pulse to the command pulse to servo section 29.

Motor 30 for each feed axis is driven by the drive current which is amplified by servo section 29 to thereby move the feed axis. Servo section 29 controls based on the velocity feedback from motor 30 and the position feedback from an unshown position detecting device such that each feed axis is moved at desired velocity to desired position.

The present invention also includes a device that is constructed such that the command position is obtained from reading and interpreting section 22 for correction, and the corrected command position is inputted into the interpolation section for the motor to move the machine to desired position.

Figure 3:
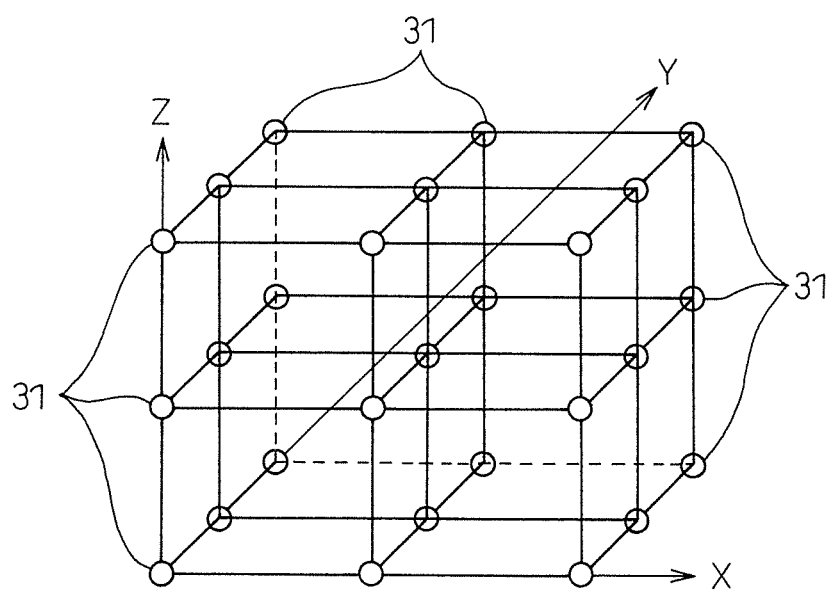
FIG. 3 is a view of lattice points in 3-dimensional Cartesian coordinate space.

Next, a method for preparing an error map will be described. In an error map, as shown in FIG. 3, lattice points 31 are set at desired positions in a direction of each axis of linear feed axes X, Y, Z in Cartesian coordinate system, and 2-dimensional array data 33 corresponding to the rotation angle of the rotational feed axes are associated with respective lattice points as shown in FIG. 4. Thus, an error map is composed as 5-dimensional array data of X, Y, Z, A, C.

An error map is composed of plural error data 34 obtained by measurement with each feed axis positioned at desired measurement points. Error data 34 are composed of position error 34a and attitude error 34b.

Position error 34a refers to an error in relative position of the main spindle relative to the table, that is, an error of the position expressed as 3-dimensional coordinate value (x, y, z) produced when the feed axes are positioned at specified positions or rotation angles. That is, a position error is the difference between the theoretical position commanded by the position command and the actual position.

Attitude error 34b refers to an error in relative attitude of the main spindle relative to the table, that is, an error expressed as inclination angles produced when the feed axes are positioned at specified positions or rotation angles. Thus, an attitude error is the difference between the theoretical inclination commanded by the position command and the actual inclination.

Measurement spacing of error data 34 is set such that the difference of position error 34a or attitude error 34b between adjoining measurement points becomes equal to a specified value. In other words, if the difference of error between adjoining measurement points is small, the measurement spacing is broadened, and if the difference of error is large, the measurement spacing is narrowed. By broadening the measurement spacing in the portion of small difference of error, amount of data can be reduced and load on memory can be thereby reduced. By narrowing the measurement spacing in the portion of large difference of error, precision of the correction of error can be kept high.

Figure 5:
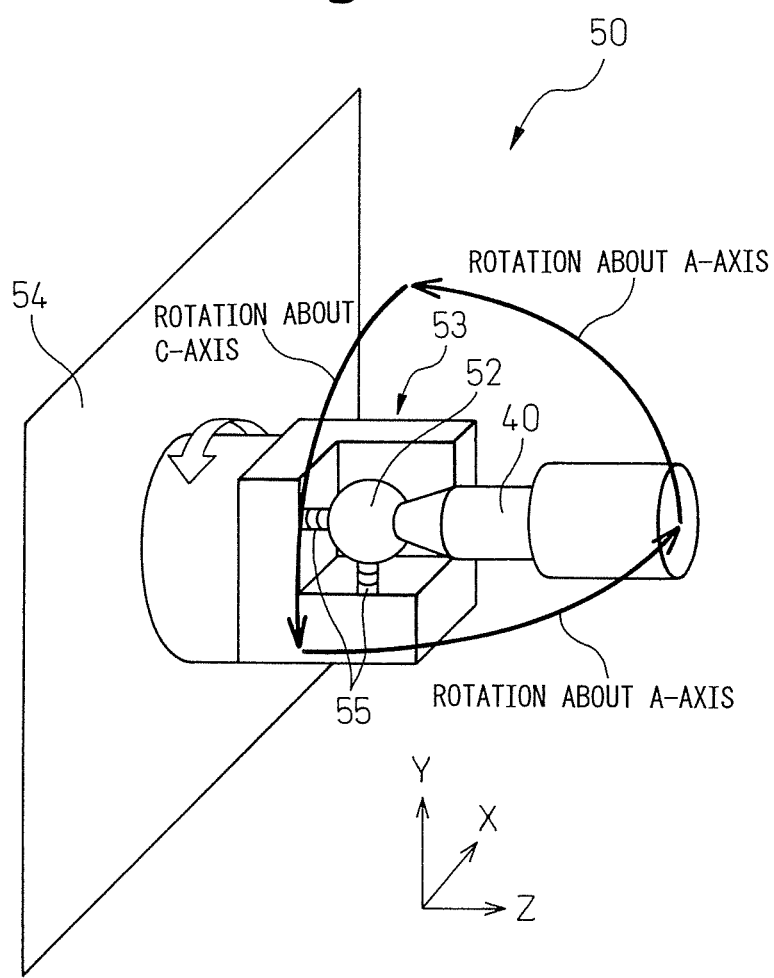
FIG. 5 is a view of a reference ball attached to the tip of a tool as it is measured with a measurement device mounted on a palette;.
Figure 6:
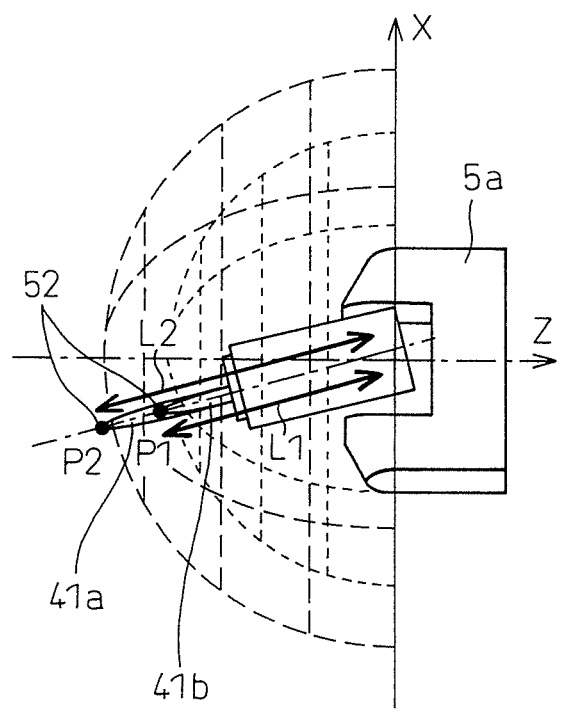
FIG. 6 is a view showing the measurement range of reference balls having support shafts of different length as seen from the direction of Y-axis.

Next, an example of measurement method for measuring position error 34a and attitude error 34b of a machine tool which has rotational feed axes A, C on the main spindle side, will be described. As shown in FIGS. 5, and 6, measurement device 50 is mounted via support shaft 40 to the main spindle of the spindle rotation type machine tool, and comprises reference ball 52 which has known values of outer dimension and of distance L1, L2 from the control point to ball center P1, P2, and sensor bracket 53 which is mounted on palette 54 fixed to the table and has non-contact type sensors 55 in X-direction, Y-direction, Z-direction. The non-contact type sensor 55 can measure the distance to the reference ball 52 in each direction in non-contacting manner. The sensor of the present invention includes not only non-contact type sensor but also contact type sensor.

Measurement is performed by dividing the measurement range of rotational feed axis A, C in even pitch or in uneven pitch, and operating, at the same time, the linear feed axis so as to maintain the center position of reference ball 52 at each division point (measurement point). As used herein, the term "even pitch" means that a measurement point is defined at every specified angle so that an angular separation between adjoining measurement points is everywhere equal, and the term "uneven pitch" means that error data are obtained only at points where error exceeds a certain defined value so that an angular separation between adjoining measurement points is generally unequal.

Figure 9:
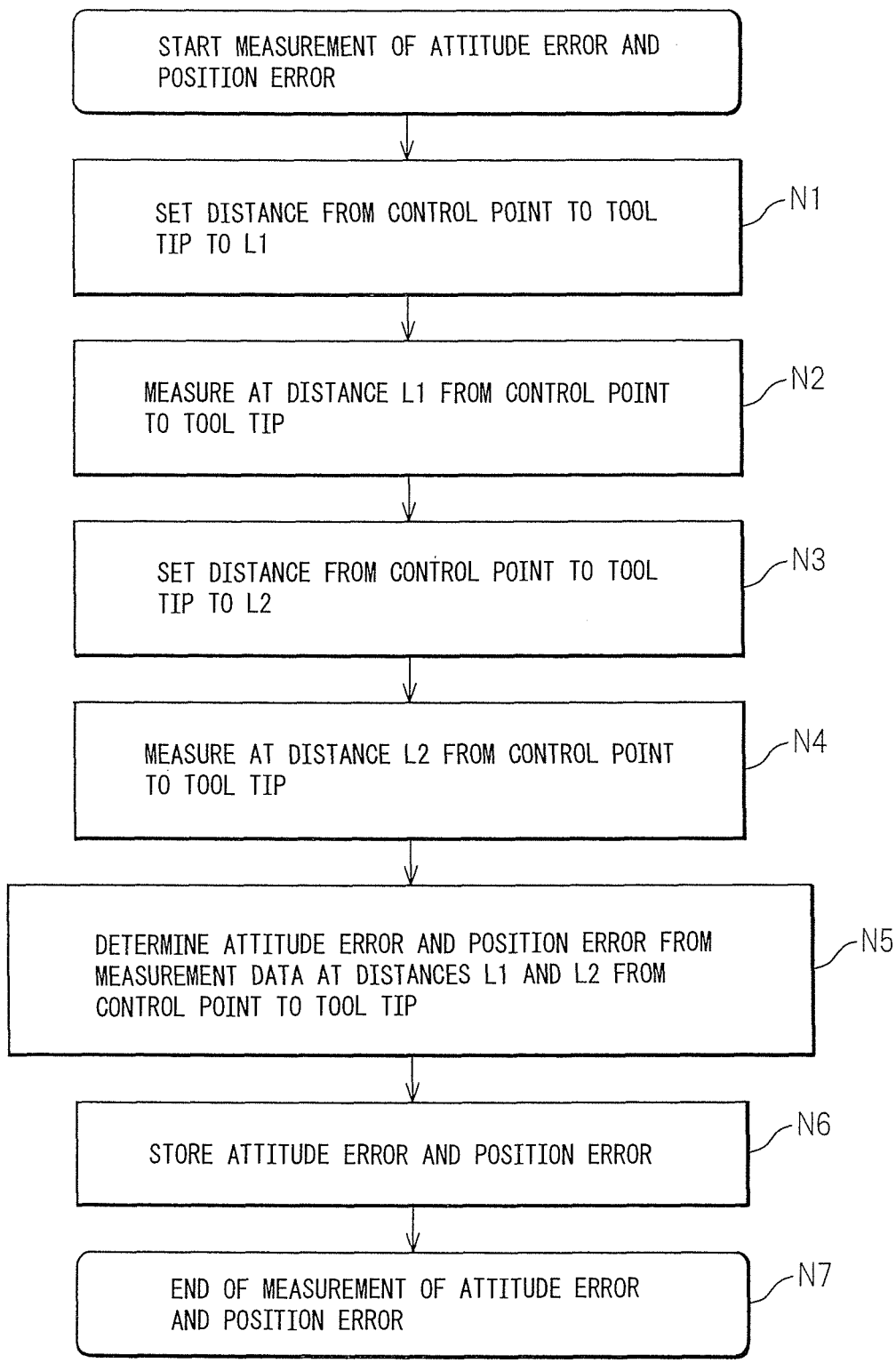
FIG. 9 is a detailed flow chart showing M3 of the flow chart of FIG. 8.

As shown in FIG. 9, center position P1 of reference ball 52 is measured in directions X, Y, Z that are orthogonal to each other using measurement device 50 equipped with non-contact type sensors 55. In order to determine actual relative attitude and actual control point, the reference ball having support shaft 40 of different length is attached as shown in FIG. 6, and center position P2 of reference ball 52 is measured again. By attaching support shafts 41a, 41b of different lengths for measurement, relative attitude of the main spindle and the table can be determined.

The present invention includes the use of a support shaft whose length can be adjusted. In the present embodiment, the control point is set at the intersection point of the rotation center of first rotational feed axis C and the rotation center of second rotational feed axis A. As used herein, the term "relative attitude" refers to the relative inclination of the main spindle and the table.

Sensor bracket 53 of measurement device 50 is mounted rotatably about an axis that is parallel to Z-axis. Thus, when measurement is to be performed over entire 360 degrees, the sensor bracket can be rotated about the axis that is parallel to Z-axis by 90 degrees four times to perform measurement.

Figure 7:
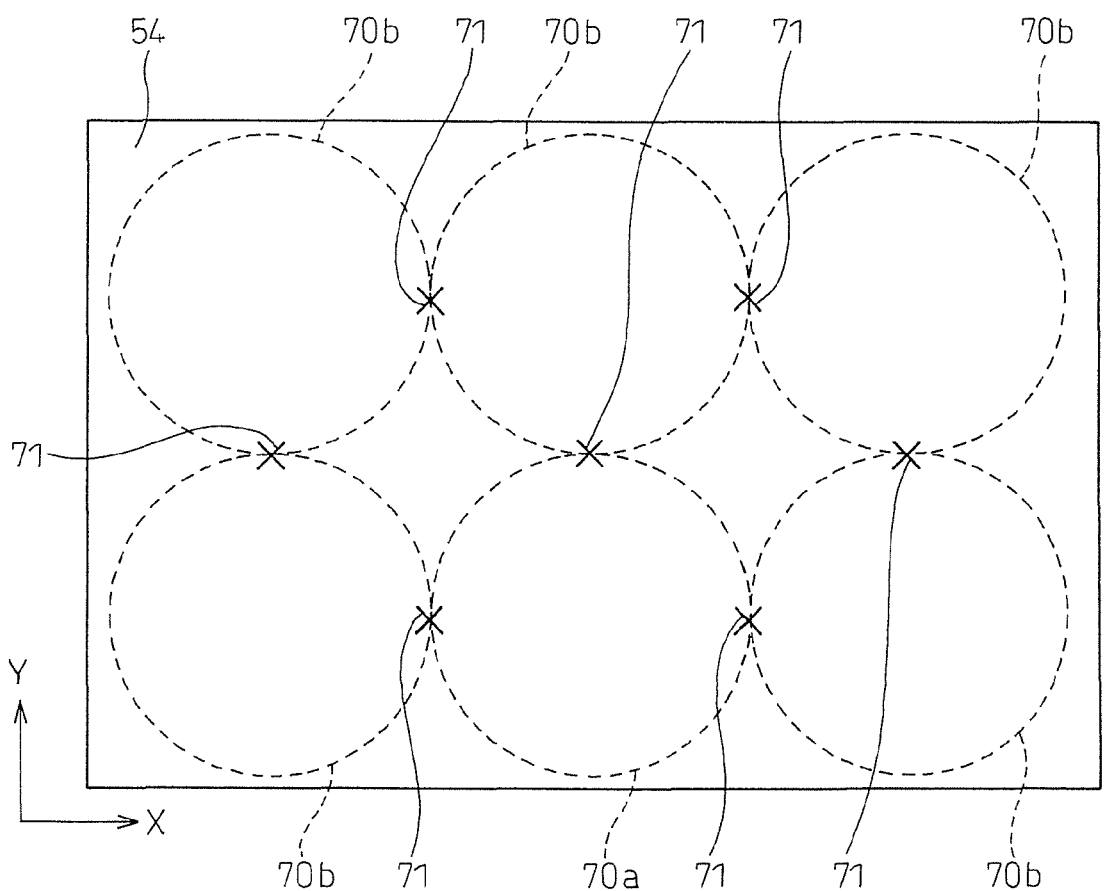
FIG. 7 is a view of a method for determining plural measurement regions.
Figure 8:
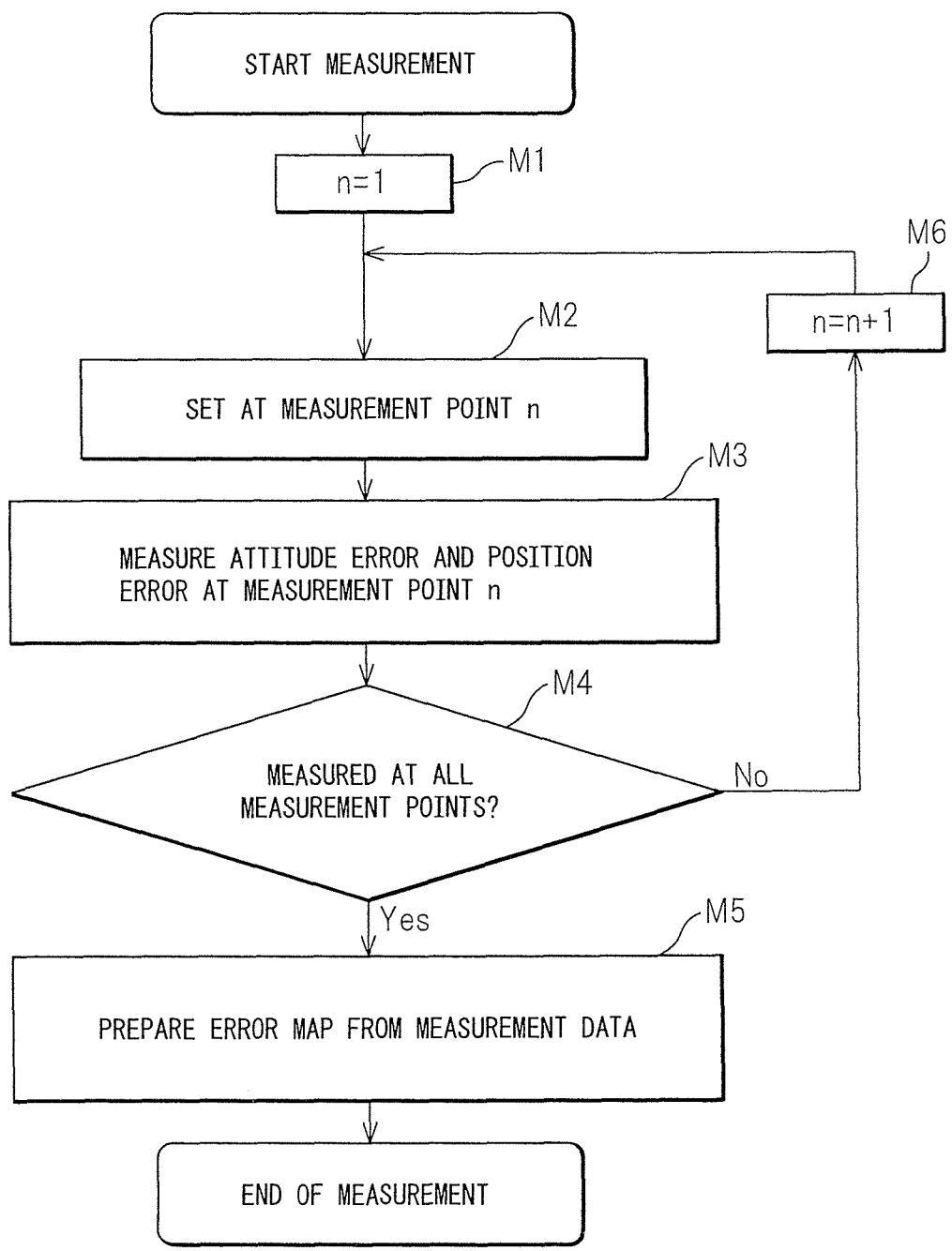
FIG. 8 is a flow chart of a first measurement method for measuring a position error and an attitude error.

As shown in FIGS. 7 and 8, when the region to be measured is large, measurement can be performed by dividing the region into plural measurement regions. In this case, in first measurement region 70a, which is to be used as a reference, operating ranges of linear feed axes X, Y, Z are measured with a laser gauge, an indicator, or the like, and adjustment is performed to obtain adequate precision as required. The present invention includes a case where adjustment of the precision of the operating ranges of linear feed axes X, Y, Z in first measurement region 70*a* is not performed, and error is computed taking into account the result of the measurement. This is intended to restrict the result of measurement in first measurement region 70*a* to the error produced when rotational feed axes A, C are rotated.

The measurement points in measurement regions 70*a*, 70*b* are defined such that there exists at least one measurement points 71 having the same coordinate value of the linear feed axes as the measurement points in the adjoining measurement region. This is because an error in mounting measurement device 50 should not influence the result of measurement between first measurement region 70*a* and other measurement region 70*b*.

The error in mounting measurement device 50 can be determined by subtracting the error due to difference of the rotation angle of the rotational feed axes from the difference of the result of measurement between measurement points having same coordinate value of the linear feed axes. By subtracting this error in mounting from the result of measurement in each measurement region, same result of measurement can be obtained as if all the measurement regions are measured in one proper arrangement.

Figure 10:
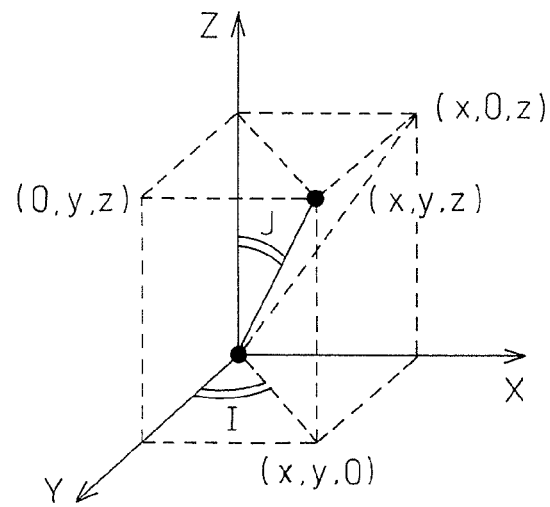
FIG. 10 is a view of the attitude error expressed in two variables.

Next, a method for computing the position error and the attitude error will be described. First, the attitude error is determined as follows. Commanded relative inclination of the main spindle relative to the table is determined from the command value of the rotation angles of rotational feed axes A, C. Here, the angle formed by the rotation axis of the main spindle and the normal (perpendicular line) to the work piece attaching surface of the angle plate (equerre) is taken as the relative attitude of the main spindle and the table. From center positions P1, P2 of reference ball 52 at two measured points, a line is determined that passes through points P1, P2, and the angle formed by this line and the normal to the work piece attaching surface of the angle plate (equerre) is taken as the actual relative inclination of the main spindle relative to the table. Difference between the commanded relative inclination of the main spindle relative to the table and the actual relative inclination of the main spindle relative to the table is determined as the attitude error. The attitude error is expressed by the angle difference i relative to Z-axis as seen from X-axis direction, the angle difference j relative to Z-axis as seen from Y-axis direction, and the angle difference k relative to Y-axis as seen from Z-axis direction. The present invention includes a case where, as shown in FIG. 10, the attitude error is expressed by two angles I, J.

Next, the position error is determined as follows. In the present embodiment, the control point is set at the intersection point of the rotation center of first rotational feed axis C and the rotation center of second rotational feed axis A. Thus, to whatever rotation angle the rotational feed axes are moved, the theoretical position of the control point does not change. The commanded position of the control point is determined from the command values of linear feed axes X, Y, Z. The position of the control point refers to the relative position of the reference point of the table relative to the control point of the main spindle. On the line passing through the points P1 and P2 that is determined in the above-described step of determining the attitude error, the position of a point at a distance L2 in the direction from P2 to P1 is determined and is taken as the actual position of the control point. A vector from the position of the commanded control point to the position of the actual control point is determined and is taken as the position error. The position error vector can be split into components in the direction of X-axis, Y-axis, Z-axis, and is expressed in the form of (x, y, z). The present invention includes a case where the position error vector is expressed in other form.

Figure 11:
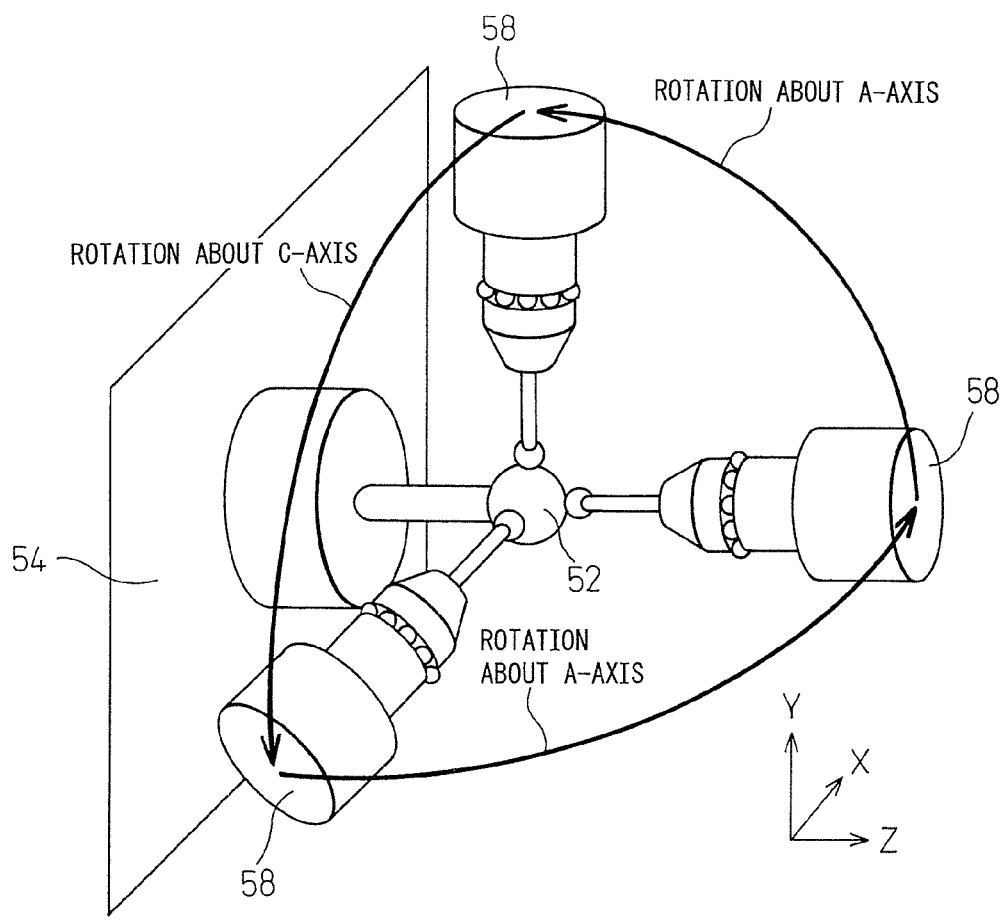
FIG. 11 is a view showing an example of a spindle rotation type machine having a reference ball attached to the palette side and a measurement device mounted on the main spindle side.

FIG. 11 is a view showing an embodiment in which, in a spindle rotation type machine, reference ball 52 is attached to the side of palette 54 and displacement detection probe 58 is mounted on the spindle side. Displacement detection probe 58 is constructed such that it is displaced in a direction of the normal at the measurement point of the object to be measured, and the amount of the displacement is detected.

Figure 12:
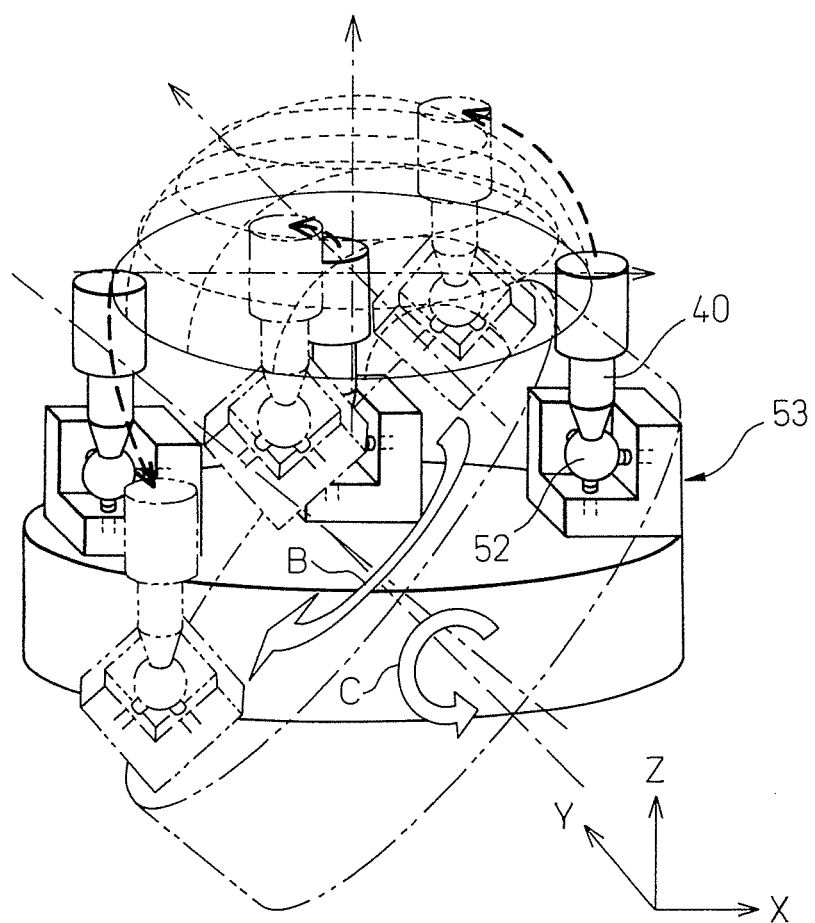
FIG. 12 is a view showing an example of a table rotation type machine having a measurement device mounted on the table and a reference ball attached to the main spindle.

FIG. 12 is a view showing an embodiment in which the present invention is applied to a table rotation type machine having rotational feed axes B, C on the table side. In the embodiments shown in FIGS. 11 and 12, the error of the feed axes can be measured based on the same principle as in the embodiment shown in FIG. 5.

Figure 13:
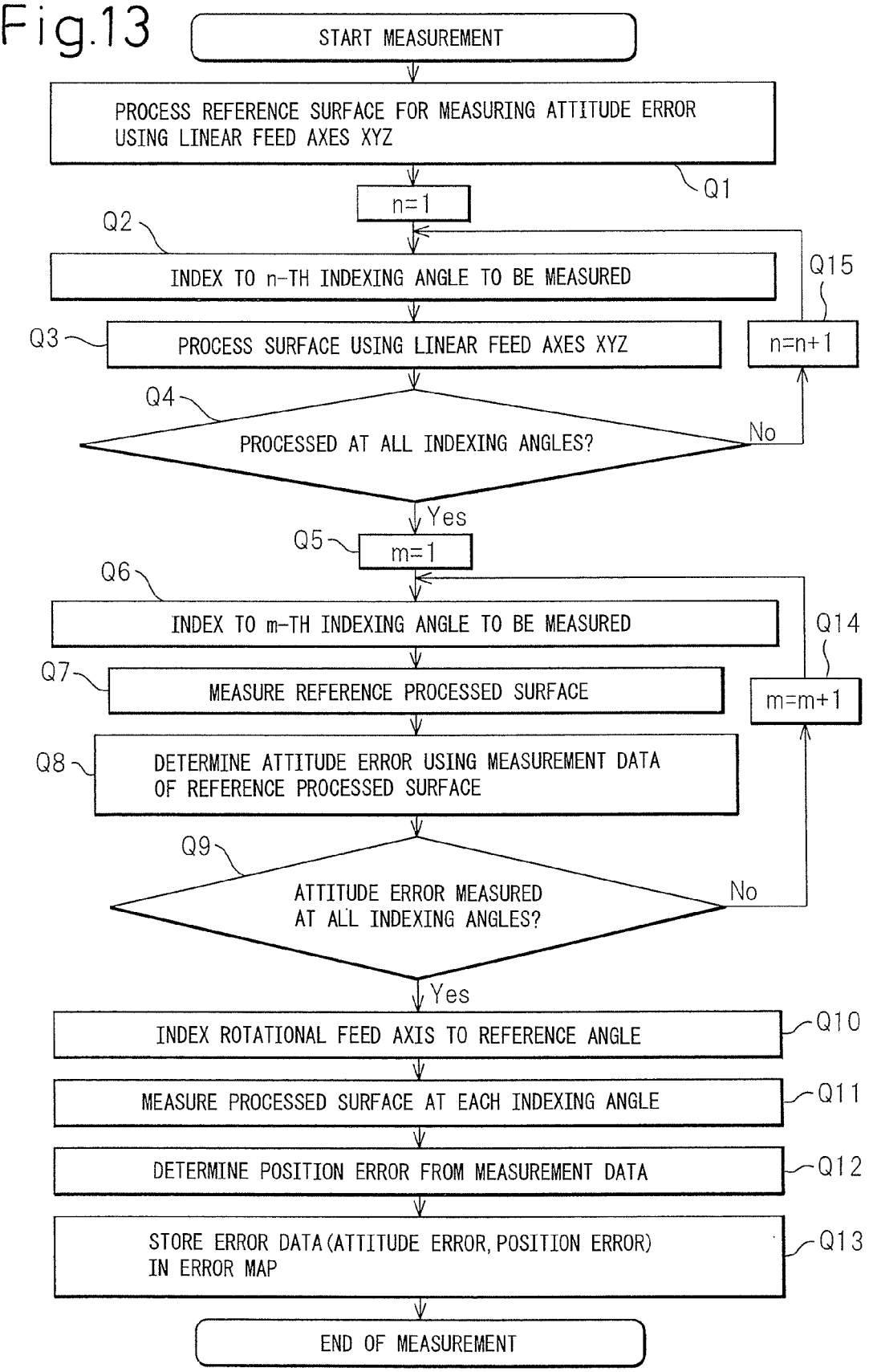
FIG. 13 is a flow chart of a second measurement method for measuring a position error and an attitude error.

Next, an example of measurement method for measuring position error 34*a* and attitude error 34*b* of a machine tool having rotational feed axes B, C on the table side will be described. FIG. 13 is a flow chart showing this measurement method. In this measurement method, without using any special measurement device, a test piece or a work piece is processed on the machine, and the processed test piece or work piece is measured with a touch probe mounted on the main spindle to thereby determine the position error and the attitude error. A cubic test piece is used in the present embodiment.

Figure 14:
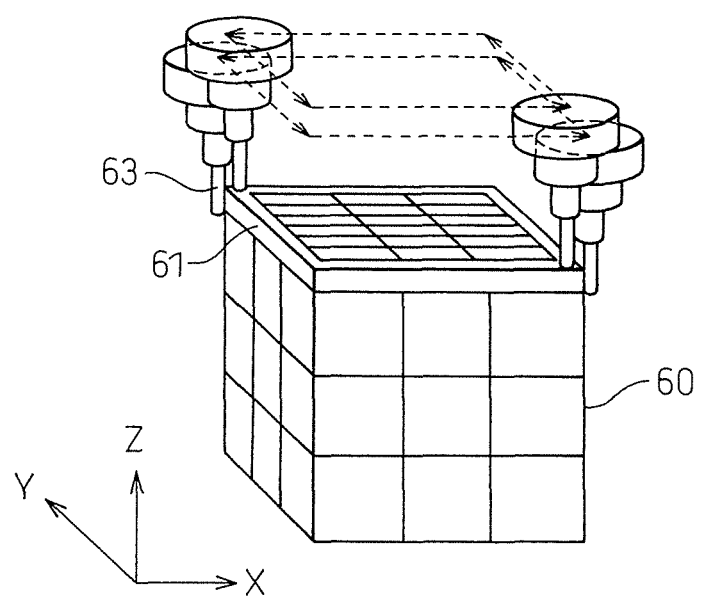
FIG. 14 is a view of a state in which each surface is processed only with operation of the linear feed axes.

As shown in FIG. 13, rotational feed axes B, C are indexed to sufficiently small rotation angle (in this case, 0 degree for axis B, 0 degree for axis C) as required for sufficient precision of the position error and the attitude error, and as shown in FIG. 14, each surface of test piece 60 (frame-like reference processing surface 61) having X, Y, Z-axis directions as the normal is processed without operating the rotational feed axes.

The reason why reference processing surface 61 is frame-like is that the attitude error can be thereby accurately determined even when a large number of measurement points are used, and the attitude error can be determined more accurately by using the entire length of the test piece to measure the inclination. Here, a ball end mill is used as cutting tool 63. Reference processing surface 61 is used as the reference for measuring the attitude error at a specified rotation angle of the rotational feed axes.

Figure 16:
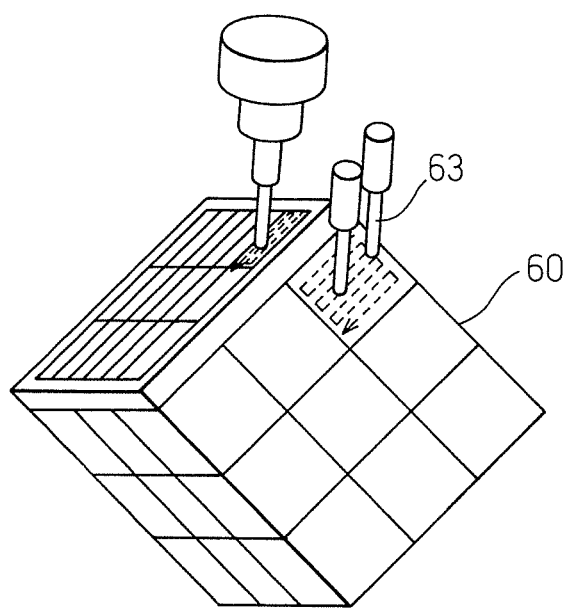
FIG. 16 is a view of a state in which a work piece is processed into a lattice-like face at the indexed angle for the rotational feed axes B, C.

Then, as shown in FIG. 16, the rotational feed axes are indexed to each measurement point, and three surfaces of the test piece that are orthogonal to each other are processed by operating only the linear feed axes. As shown in FIG. 15, a specified area is allotted as the area to be processed in accordance with the indexed angle of the rotational feed axis.

Figure 17:
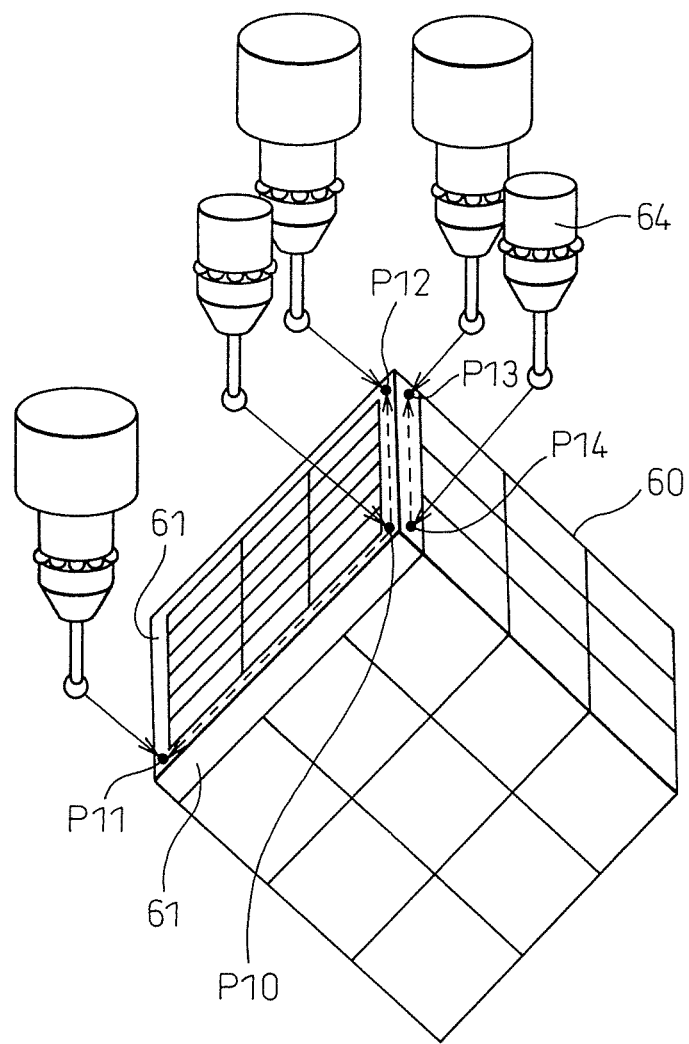
FIG. 17 is a view of a state in which each measurement surface indexed at a specified angle is being measured.

Next, as shown in FIG. 17, the rotational feed axes are indexed to each measurement point, and P10-P14 of reference processing surface 61 are measured with touch probe 64, and actual inclination of the line passing through P10 and P11, actual inclination of the line passing through P10 and P12, and actual inclination of the line passing through P13 and P14 are determined. Difference between three inclinations thus determined and three theoretical inclinations computed from position command of the rotational feed axes at the time of measurement is taken as the attitude error.

Figure 18:
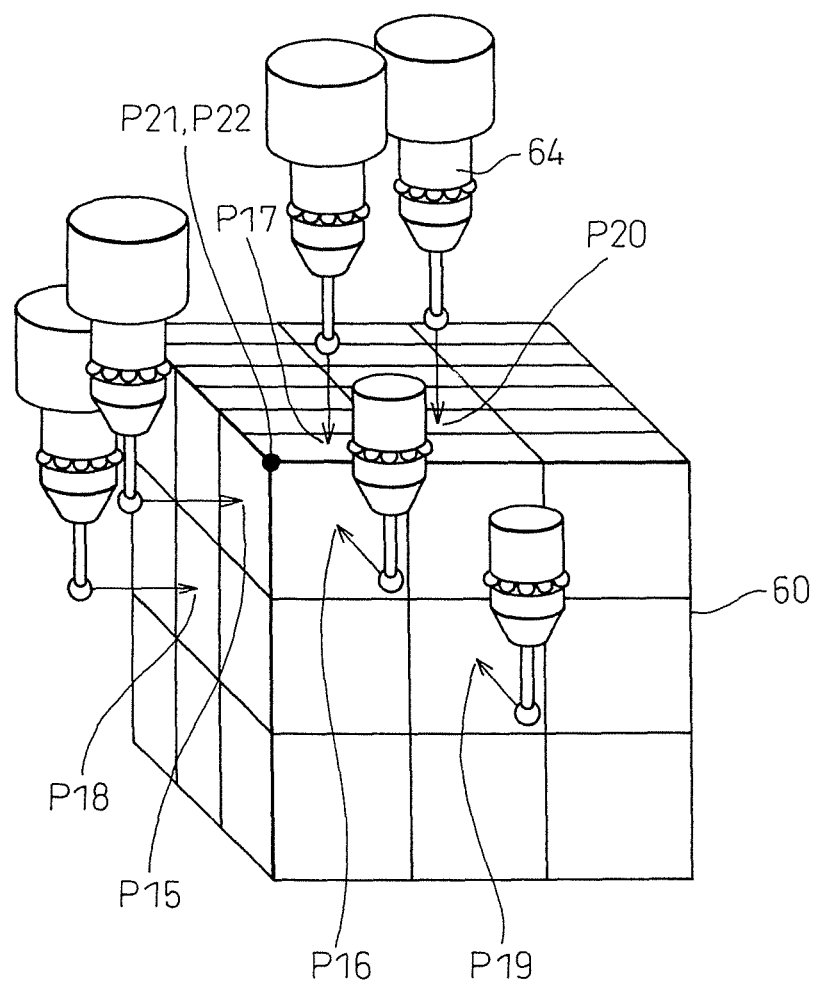
FIG. 18 is a view of a method for determining an intersection point of three planes.

Then, as shown in FIG. 18, the rotational feed axes are indexed to the reference rotation angle of 0 degree for B-axis and 0 degree for C-axis, and processed surface P15-P20 that are processed at each rotation angle are measured, and difference between the positions of processed surfaces P18-P20 that are processed with the rotational feed axis indexed to 0 degree for B-axis and 0 degree for C-axis and the positions of processed surfaces P15-P17 that are processed with the rotational feed axis indexed to other rotation angle is determined.

In the present invention, the difference of positions and/or difference of inclinations between the processed surfaces that are processed at one rotation angle and the processed surfaces that are processed at other rotation angle are referred to as the displacement of the processed surfaces.

From measurement data of the processed surfaces P18-P20, intersection point P21 of three planes containing processed surfaces P18-P20 when it is assumed that there is no attitude error is determined. From measurement data of processed surfaces P15-P17 and the determined attitude error, intersection point P22 of three planes containing processed surfaces P15-P17 is determined. Difference between intersection point P21 and intersection point P22 is taken as the position error. The present invention includes a case where a test piece or a work piece is processed with a machine tool having rotational feed axes on the main spindle side, and the position error and the attitude error are determined from measurement result of the processed surfaces.

Error determined by the above-described method is associated with the positions of linear feed axes X, Y, Z and the rotation angles of rotational feed axes B, C, as shown in FIG. 4, and is stored as an error map.

Next, a correction method for correcting the position command using an error map including the position error and the attitude error will be described taking a spindle rotation-type machine which has rotational feed axes A, C (see FIGS. 1 and 2) as an example.

First, the command position of processing program 21 is read by reading and interpreting section 22, and interpolation section 23 determines the command pulse for each of feed axes X, Y, Z, A, C for every specified interpolation period.

Then, position command recognition means 24 recognize from the command pulses the position command for each of feed axes X, Y, Z, A, C for every specified interpolation period.

If the position of each feed axis in the position command is the same as the position of the measurement point stored in error data storage section 25, error data 34 are obtained, and correction data are determined based on the obtained error data. If the position of each feed axis in the position command is not the same as the position of the measurement point stored in error data storage section 25, the error data are obtained from the error data of nearby measurement point using known interpolation method, and correction data are determined based on the error data thus interpolated. Correction data thus determined are added to the position command to obtain new position command for every interpolation period. The position command is corrected in this manner, and each of the feed axes can be positioned with high precision.

Next, a correction method for correcting the position command by expressing in 3-dimensional coordinate values the correction value that has been computed by the correction data computing section 26, will be described. In case, for example, where, with C axis set at the rotation angle of 0 degree, an attitude error appears in a direction of B-axis which is not proper to the machine, there is a problem that the rotational feed axes need to be rotated considerably in order to correct the attitude error in a direction of B-axis. This problem is referred to as singular point problem in the present invention. The correction method described below is a correction method for circumventing this singular point problem. B-axis is an axis of a rotational feed axis that is parallel to Y-axis.

FIG. 19 is a flow chart showing this correction method. Computation formula for determining the position correction vector based on the attitude and attitude error of a tool, the position and position error of a tool, and the projecting length of a tool according to this method is shown below, where:

L: distance from the command point to the position of tool tip,

[I, J, K]: command attitude of the tool,

[dI, dJ, dK]: attitude error,

[dX1, dY1, dZ1]: position error,

[dX2, dY2, dZ2]: position error of the tool tip produced by the attitude error,

[dX3, dY3, dZ3]: position error of the tool tip, $$dX2 = L \times (\tan(J+dJ)/((\tan(I+dI))^2 + (\tan(J+dJ))^2 + 1)^{1/2} - (\tan(J)/((\tan(I))^2 + (\tan(J))^2 + 1)^{1/2})$$

$$dY2 = L \times (\tan(I+dI)/((\tan(I+dI))^2 + (\tan(J+dJ))^2 + 1)^{1/2} - (\tan(I)/((\tan(I))^2 + (\tan(J))^2 + 1)^{1/2})$$

$$dZ2 = L \times (1/((\tan(I+dI))^2 + (\tan(J+dJ))^2 + 1)^{1/2} - (1/((\tan(I))^2 + (\tan(J))^2 + 1)^{1/2})$$

$$dX3 = dX1 + dX2$$

$$dY3 = dY1 + dY2$$

$$dZ3 = dZ1 + dZ2$$

First, at step S0, the command position and the command attitude that are commanded by the position command outputted from interpolation section 23 are recognized. At step S1, error data 34 corresponding to the command position are obtained from the error map. At step S2, the position correction vector for correcting the position error is computed from position error 34a of error data 34.

On the other hand, from attitude error 34b of error data 34, at step S5, the attitude correction value is computed. At step S6, the attitude correction value obtained at step S5 is added to the command attitude read out at step S3 to determine the attitude after correction. At step S7, from the attitude after correction obtained at step S6 and the projecting length of the tool, the command point after correction is determined.

At step S4, from the command attitude read out at step S3 and the projecting length of the tool, the command point before correction is determined. At step S8, position correction vector of the command point for correcting the attitude error is computed by subtracting the command point before correction obtained at step S4 from the command point after correction obtained at step S7. This is referred to as the attitude correction vector.

The attitude correction vector is a vector representing the magnitude and direction of the displacement of the tool tip when, with the basal end of the tool held by the main spindle as the control point, the rotational feed axes are rotated so as to correct the attitude error with the control point as the fulcrum.

Finally, at step S9, the attitude correction vector obtained at step S8 and the position correction vector obtained at step S2 are added.

In the present invention, the command point refers to the position of the tool tip (tool tip position), and the tool tip position means the actual position of the tool tip, the position of the processing point of the tool tip portion, the center of the semi-sphere of the tip portion of a ball end mill, etc.

As has been described above, the error of the tool tip position is corrected only by the movement of the linear feed axes, so that the rotational feed axes are not rotated during the correction of attitude error 34*b*, and the singular point problem can be circumvented.

Thus, in accordance with the present embodiment, the position error and the attitude error of a machine tool having plural rotational feed axes can be measured and an error map can be prepared. Since, in the error map thus prepared, the position error and the attitude error are stored as separate error data, the position command can be corrected based on the error data, and the tool tip can be positioned to a target position with high precision to permit high precision processing.

The present invention is not limited to the embodiments described above, but can be implemented in various modifications without departing from the scope and spirit of the invention. For example, in the present embodiment, numerical control device 20 comprises a computation section that computes position error and the attitude error at the measurement points based on the measurement data obtained by measurement device 50 and the coordinate values of the measurement points, and error data storage means 25 for storing the position error and the attitude error computed by the computation section in correspondence to the position of the linear feed axes and the rotation angle of the rotational feed axes. It is also possible, in place of numerical control device 20 to use personal computer or other device for the computation section or the error data storage means.

The invention claimed is:

1. A numerically controlled machine tool which has a linear feed axis and a rotational feed axis and which has functions of measuring in advance errors of a relative position and a relative attitude of a main spindle relative to a work table by positioning said linear feed axis and said rotational feed axis to specified position and attitude, and of correcting a movement command based on measured error data, said error data being multi-dimensional data containing a position error and an attitude error, said machine tool comprising:
    an error data storage means which store an error map that is prepared by collecting a plurality of said error data corresponding to positions and rotation angles of said linear feed axis and said rotational feed axis, and
    a correction data computing means which compute correction data for correcting said movement command from a command position for said linear feed axis and said rotational feed axis and said error data stored in said error data storage means.

2. The numerically controlled machine tool according to claim 1,
    wherein said position error is an error of relative position of said main spindle relative to said work table, an error being expressed as 3-dimensional coordinate values when said rotational feed axis is positioned to specified rotation angle, and
    wherein said attitude error is an error of relative attitude of said main spindle relative to said work table, an error being expressed as inclination angle when a first rotational feed axis and a second rotational feed axis that are orthogonal to each other are positioned at specified rotation angles.

3. The numerically controlled machine tool according to claim 2,
    wherein a measurement spacing of said rotation angles in said first rotational feed axis and said second rotational feed axis is set such that a difference of said attitude error between adjoining measurement points is a specified value.

4. The numerically controlled machine tool according to claim 2 or 3,
    wherein, when a tool tip position of a rotary tool mounted to said main spindle is to be positioned in accordance with said command position, said correction data computing means compute an amount of a deviation of 3-dimensional coordinate values of said tool tip position from said attitude error and a dimension of said rotary tool, and thereby correct said movement command for said linear feed axis.

5. A numerical control device which controls a machine tool having a linear feed axis and a rotational feed axis and which has a function of correcting movement command for feed axes based on error data that have been measured in advance, said device comprising:
    an error data storage means that store an error map prepared by collecting a plurality of said error data corresponding to a position and rotation angle of said feed axes, said error data being data containing a position error and an attitude error, and
    a correction data computing means which compute correction data for correcting said movement command from a command position for said feed axes and said error data stored in said error data storage means.

* * * * *